United States Patent [19]
Anderson et al.

[11] Patent Number: 5,948,857
[45] Date of Patent: Sep. 7, 1999

[54] GELATIN-MODIFIED POLYURETHANE

[75] Inventors: Charles C. Anderson, Penfield; Brian A. Schell, Honeoye Falls; Gary R. Opitz, Rochester, all of N.Y.

[73] Assignee: Eastman Kodak Company, Rochester, N.Y.

[21] Appl. No.: 09/090,578

[22] Filed: Jun. 4, 1998

[51] Int. Cl.$^6$ .............................. C08L 75/04; C08L 89/00; C08H 1/00
[52] U.S. Cl. .......................... 525/54.1; 524/22; 524/704; 524/839; 524/840; 525/453; 527/200; 527/204; 527/207; 528/71
[58] Field of Search .............................. 524/22, 704, 839, 524/840; 525/54.1, 453; 527/200, 204, 207; 528/71

[56] References Cited

U.S. PATENT DOCUMENTS

| | | | |
|---|---|---|---|
| 3,240,604 | 3/1966 | Cook | 430/505 |
| 4,266,015 | 5/1981 | Butler et al. | 430/527 |
| 4,824,640 | 4/1989 | Hildenbrand et al. | 422/56 |
| 4,855,219 | 8/1989 | Bagchi et al. | 430/496 |
| 5,066,572 | 11/1991 | O'Connor et al. | 430/503 |
| 5,173,739 | 12/1992 | Kurachi et al. | 356/124 |
| 5,248,558 | 9/1993 | Bagchi et al. | 428/407 |
| 5,330,855 | 7/1994 | Semancik et al. | 428/701 |
| 5,786,134 | 7/1998 | Nair et al. | 430/517 |

FOREIGN PATENT DOCUMENTS 476 535 B1  3/1992  European Pat. Off. .

OTHER PUBLICATIONS

Research Disclosure No. 38957, Sep. 1996, p. 601.

*Primary Examiner*—Rabon Sergent
*Attorney, Agent, or Firm*—Carl F. Ruoff

[57] ABSTRACT

The present invention is a water-dispersible polyurethane composed of a polyurethane containing carboxylate groups covalently bonded to gelatin through a grafting agent. The polyurethane is formed by providing a polyurethane dispersion containing carboxylate groups wherein the polyurethane dispersion has an acid number of at least 5. The polyurethane dispersion is contacted with a grafting agent. The polyurethane dispersion with the grafting agent is contacted with gelatin to form a polyurethane covalently bonded to gelatin wherein a ratio of gelatin to polyurethane is from 1:10 to 2:1.

6 Claims, No Drawings

GELATIN-MODIFIED POLYURETHANE

CROSS REFERENCE TO RELATED APPLICATIONS

This application relates to commonly assigned copending application Ser. No. 09/090,831, filed simultaneously herewith. This application relates to commonly assigned copending application Ser. No. 09/090,579, filed simultaneously herewith. This application relates to commonly assigned copending application Ser. No. 09/090,576, filed simultaneously herewith. This application relates to commonly assigned copending application Ser. No. 09/090,827, filed simultaneously herewith.

FIELD OF THE INVENTION

The present invention relates to water-dispersible polyurethanes and to the use of such materials in imaging materials. In particular the invention relates to water-dispersible polyurethanes that have been grafted to gelatin and the use of these compositions in photographic materials.

BACKGROUND OF THE INVENTION

Hydrophilic colloids such as gelatin have many unique and desirable properties that make them especially useful in the preparation of photographic materials. For example, gelatin has high swellability in aqueous media which allows rapid diffusion of compounds in and out of a gelatin-containing photographic layer during film processing. Gelatin is also an excellent dispersing medium for light-sensitive silver halide grains and aqueous gelatin solutions exhibit excellent coating properties and quickly undergo gelation when chilled; all of these properties are critical to the manufacture of photographic films. In addition, crosslinked gelatin layers provide very good physical properties such as resistance to scratch, abrasion, ferrotyping, and blocking.

In recent years, the conditions under which photographic materials are manufactured or utilized have become more demanding. For example, applications for photographic materials have been extended to high humidity and high temperature environments. Under these conditions, conventional photographic materials may not have adequate dimensional stability or resistance to sticking, blocking, and ferrotyping. Recent patents have disclosed photographic systems (for example, Advanced Photographic Systems) where the processed film may be re-introduced into a cassette. This system allows for compact and clean storage of the processed film until such time when it may be removed for additional prints or to interface with display equipment. Storage in the cassette is preferred to facilitate location of the desired exposed frame and to minimize contact with the negative during subsequent usage. U.S. Pat. No. 5,173,739 discloses a cassette to thrust the photographic element from the cassette, eliminating the need to contact the film with mechanical or manual means. Published European Patent Application 0 476 535 A1 describes how the developed film may be stored in such a cassette. The dimensions of such a so-called thrust cassette requires that the processed photographic element is wound tightly and under pressure, causing direct close contact between the front and back sides which may result in ferrotyping, especially at high temperature and high humidity storage conditions. In order to maximize productivity and reduce cost, photographic materials must be manufactured and processed at very high speeds, thus they may be more easily scratched and abraded. These scratches or abrasion marks are visible during printing or projection of the photographic material.

Various methods have been described to improve the physical properties of hydrophilic colloid-containing layers used in imaging. For example, U.S. Pat. No. 3,240,604 describes a gelatin layer containing discrete poly (tetrafluoroethylene) granules present in a concentration range of 0.05 to 10 parts of poly(tetrafluoroethylene) per part gelatin. U.S. Pat. No. 4,266,015 describes a light sensitive material which includes an outermost layer comprising a fluorine-containing homopolymer or copolymer. Due to their very hydrophobic nature, these fluoropolymers are not very compatible with coating solutions containing a hydrophilic colloid such as gelatin. In addition, these polymer particles can fall-off in processing solutions due to their weak interaction with the hydrophilic colloid binder.

The addition of latex polymers prepared from ethylenically unsaturated monomers to hydrophilic colloid-containing layers to achieve improved properties such as, increased dimensional stability, reduced curl, decreased pressure sensitivity, improved dryability, and improved scratch resistance, is described, for example, in Research Disclosure No. 38957, September 1996, page 601. However, when a large amount of the latex is added to the gelatin, the latex may flocculate. In addition, when a large amount of the latex is added to the hydrophilic colloid-containing outermost protective layer, the latex, especially if it is a low Tg latex, may cause sticking and blocking of the photographic material when it is stored at high temperature.

Methods have been described that reportedly improve the compatibility between the latex polymer and the hydrophilic colloid in order to prevent flocculation of the latex and to improve the adhesion between the latex polymer and the hydrophilic colloid. For example, in U.S. Pat. Nos. 4,855,219, 5,066,572, 5,248,558, 5,330,885, and others, gelatin-coated latex polymers and gelatin-grafted latex polymers and their use in photographic elements are described. Typically, these latex polymers are either soft or hard (meth)acrylate copolymer latexes that provide good, but, not outstanding resistance to scratch, abrasion, and ferrotyping. Therefore, there continues to be a need to further improve the physical performance of photographic materials without sacrificing coating solution stability, surface tackiness, etc. It is toward such an objective that the present invention is directed.

SUMMARY OF THE INVENTION

The present invention is a water-dispersible polyurethane composed of a polyurethane containing carboxylate groups covalently bonded to gelatin through a grafting agent. The polyurethane is formed by providing a polyurethane dispersion containing carboxylate groups wherein the polyurethane dispersion has an acid number of at least 5. The polyurethane dispersion is contacted with a grafting agent. The polyurethane dispersion with the grafting agent is contacted with gelatin to form a polyurethane covalently bonded to gelatin wherein the ratio of gelatin to polyurethane is from 1:10 to 2:1.

DETAILED DESCRIPTION OF THE INVENTION

The present invention provides a novel polyurethane composition and a method of preparing the same. The novel polyurethane is an aqueous dispersed polyurethane which is gelatin-grafted. The method comprises taking a dispersion of a polyurethane containing carboxylic acid or carboxylic acid salt groups in water and adding a gelatin grafting agent into the polyurethane dispersion. Gelatin is added to the polyurethane dispersion and grafting agent to form a gelatin-grafted polyurethane dispersion. The addition of the gelatin-grafted polyurethane to hydrophilic colloid-containing layers used in imaging elements provides improved physical properties to the dried layer and the imaging element.

The gelatin-grafted polyurethane compositions of the invention are useful for a wide variety of applications in imaging elements. For example, they may be added to one or more hydrophilic colloid-containing layers such as light-sensitive silver halide emulsion layers, curl control layers, antihalation layers, surface protective overcoats, and the like. They may also be used in subbing layers, backing layers, antistatic layers, and the like. Compared with the gelatin-grafted latex polymers described in the prior art, gelatin-grafted polyurethanes provide improved physical properties due to the superior combination of strength, modulus, and toughness typical of polyurethanes compared with conventional (meth)acrylic latex polymers.

The polyurethanes useful in the present invention are water dispersible polyurethanes containing carboxylate groups, such as carboxylic acid or carboxylic acid salt groups, that are covalently bonded to gelatin with the aid of a grafting agent. Water dispersible polyurethanes are well known and are prepared by chain extending a prepolymer containing terminal isocyanate groups with an active hydrogen compound, usually a diamine or diol. The prepolymer is formed by reacting a diol or polyol having terminal hydroxyl groups with excess diisocyanate or polyisocyanate. To permit dispersion in water, the prepolymer is functionalized with hydrophilic groups. Anionic, cationic, or nonionically stabilized prepolymers can be prepared.

Anionic dispersions contain usually either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized prepolymers can be prepared by the use of diol or diisocyanate co-monomers bearing pendant polyethylene oxide chains. These result in polyurethanes with stability over a wide range of pH. Nonionic and anionic groups may be combined synergistically to yield "universal" urethane dispersions. For the purpose of the present invention, the polyurethane dispersion contains anionic groups that are carboxylic acid salt groups. The polyurethane dispersion may also contain nonionic groups in combination with the carboxylic acid salt anionic groups. In order to provide sufficient carboxylate groups for grafting it is necessary that the polyurethane has an acid number of at least 5. Acid number is defined as the milligrams of KOH required to neutralize one gram of polymer.

One of several different techniques may be used to prepare polyurethane dispersions. For example, the prepolymer may be formed, neutralized or alkylated if appropriate, then chain extended in an excess of organic solvent such as acetone or tetrahydrofuran. The prepolymer solution is then diluted with water and the solvent removed by distillation. This is known as the "acetone" process. Alternatively, a low molecular weight prepolymer can be prepared, usually in the presence of a small amount of solvent to reduce viscosity, and chain extended with diamine just after the prepolymer is dispersed into water. The latter is termed the "prepolymer mixing" process and for economic reasons is much preferred over the former.

Polyols useful for the preparation of polyurethane dispersions include polyester polyols prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as the aforementioned alkyl acrylate or methacrylates with ethylenically unsaturated monomers containing functional groups such as carboxyl, hydroxyl, cyano groups and/or glycidyl groups.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cycopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersibility are trimethylamine, triethylamine, dimethylaniline, diethylaniline, triphenylamine and the like.

Diamines suitable for chain extension of the polyurethane include ethylenediamine, diaminopropane, hexamethylene diamine, hydrazine, aminoethylethanolamine and the like.

Solvents which may be employed to aid in formation of the prepolymer and to lower its viscosity and enhance water dispersibility include methylethylketone, toluene, tetrahydrofuran, acetone, dimethylformamide, N-methylpyrrolidone, and the like. Water-miscible solvents like N-methylpyrrolidone are much preferred.

The polyurethanes useful in the practice of the present invention may be either glassy polyurethanes (i.e., $T_g$ greater than about 25° C.) or they may be rubber polyurethanes (i.e., $T_g$ less than about 25° C.) depending on the use for which they are intended. For example, when the gelatin-grafted polyurethanes of the invention are to be used in subbing layers or cushioning layers it may be desirable to use a rubber polyurethane. However, when the gelatin-grafted polyurethane is to be used in an outermost layer such as a protective overcoat layer it may be desirable to use a glassy polyurethane in order to provide the best resistance to scratch and sticking.

The gelatin to be covalently bound to the polyurethane can be any of the known types of gelatin. These include, for example, alkali-treated gelatin (cattle bone or hide gelatin), acid-treated gelatin (pigskin or bone gelatin), and gelatin derivatives such as partially phthalated gelatin, acetylated gelatin, and the like, preferably the deionized gelatins. The gelatin covalently bound to the polyurethane may be crosslinked through the use of a coventional crosslinking agent. The ratio of gelatin to polyurethane is between 1 to 10 and 2 to 1, preferably between 1 to 4 and 2 to 1.

Suitable grafting agents that can be utilized for the attachment of gelatin to the polyurethane are the carbamoylonium salts, dication ethers, and carbodiimides described in U.S. Pat. No. 5,248,558, incorporated herein by reference. The carbamoylonium compounds useful in the practice of the present invention can be obtained commercially, or prepared using known procedures and starting materials, such as described in U.S. Pat. No. 4,421,847 and references noted therein, incorporated herein by reference. Representative preferred carbamoylonium compounds include 1-(4-morpholinocarbonyl)-4-(2-sulfoethyl)pyridinium hydroxide, inner salt, and 1-(4-morpholinocarbonyl) pyridinium chloride.

Dication ethers are also useful as grafting agents for bonding gelatin to a polyurethane containing carboxylate groups. Useful dication ethers have the formula:

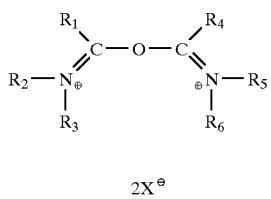

$2X^{\ominus}$

In this formula, $R_1$ represents hydrogen, alkyl, aralkyl, aryl, alkenyl, —$YR_7$, the group

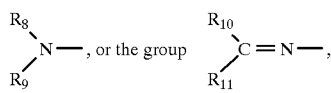

with Y representing sulfur or oxygen, and $R_7$, $R_8$, $R_9$, $R_{10}$, and $R_{11}$ each independently representing alkyl, alkyl, aralkyl, aryl, or alkenyl. Alternatively, $R_8$ and $R_9$, or $R_{10}$ and $R_{11}$ may together form a ring structure. $R_{10}$ and $R_{11}$ may each also represent hydrogen. Also, $R_1$ together with $R_2$ may form a heterocyclic ring.

$R_2$ and $R_3$ each independently represents alkyl, aralkyl, aryl, or alkenyl, or, combined with $R_1$ or each other, forms a heterocyclic ring. $R_4$, $R_5$, and $R_6$ are independently defined as are $R_1$, $R_2$, and $R_3$, respectively, and can be the same as or different from $R_1$, $R_2$, and $R_3$.

$X^-$ represents an anion or an anionic portion of the compound to form an intramolecular (inner) salt. The ethers above can be made by techniques known to those skilled in the chemical synthesis art. Useful synthesis techniques include those described in *Journal Of American Chemical Society*, 103, 4839 (1981).

Carbodiimides can also be used to attach gelatin to carboxylated polyurethane particles. Particularly preferred carbodiimide grafting agents are water-soluble carbodiimides of the formula:

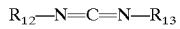

wherein each of $R_{12}$ or $R_{13}$ is selected from: cycloalkyl having from 5 to 6 carbon atoms in the ring: alkyl of from 1 to 12 carbon atoms; monoarylsubstituted lower alkyl radicals, e.g., benzyl-α- and β-phenylethyl; monoaryl radicals, e.g., phenyl; morpholino; piperidyl; morpholinyl substituted with lower alkyl radicals, e.g., ethylmorpholinyl; piperidyl substituted with lower alkyl radicals, e.g., ethylpiperidyl; di-lower alkylamino; pyridyl substituted with lower alkyl radicals, e.g., α, β, γ-methyl-or ethyl-pyridyl; acid addition salts; and quaternary amines thereof.

For the grafting of gelatin to the polyurethane dispersion, the polyurethane dispersion is preferably first contacted with the grafting agent and then with gelatin, so that the gelatin preferentially reacts with the polyurethane, instead of gelatin-gelatin cross-linking. Carbamoylpyridinium and dication ether grafting agents are advantageously utilized in the practice of this invention as these may be employed to selectively bond to a carboxyl group on a polymer particle and then with an amino group on the gelatin molecule. Carbamoylpyridinium compounds are particularly preferred.

The contacting of the polyurethane and gelatin is preferably performed in an aqueous medium. The concentration of polyurethane in the aqueous dispersion is preferably less than about 25% and more preferably less than about 15% by weight. The concentration of gelatin in the aqueous dispersion is preferably less than about 25% and more preferably less than about 15% by weight.

The pH of the aqueous dispersion and the concentration of the polyurethane and gelatin should be adjusted to prevent bridging of gelatin molecules between the polyurethane dispersion, or coagulation. The pH of the gelatin is preferably maintained above the isoelectric pH of the gelatin (e.g., above 4.8 and preferably between 8 and 10 for lime-processed bone gelatin). Under such conditions, both the polyurethane dispersion and the gelatin should have the same charge, preferably negative, in order to minimize coagulation.

It is preferred for this invention that the gelatin-grafted polyurethane dispersion be washed extensively either by dialysis or diafiltration to remove traces of reaction byproducts and low molecular weight species.

The gelatin-grafted polyurethane dispersions of the invention can be used in coating compositions alone or in combination with other water-dispersible or water soluble polymers, including; latex polymers prepared from ethylenically unsaturated monomers such as (meth)acrylic acid, (meth)acrylic acid esters, styrene and its derivatives, vinyl halides, itaconic acid and its mono- and di-esters, maleic acid and its mono- and di-esters, (meth)acrylonitrile, (meth) acrylamides, olefins, and others; water dispersible polyurethanes and polyesters; hydrophilic colloids such as gelatin, dextran, gum arabic, zein, cassein, pectin, agar-agar, polyvinyl alcohol, poly(vinyl pyrrolidone), and the like. Preferably, the gelatin-grafted polyurethane dispersions of the invention comprise from about 5 to 100 weight % of the dried layer.

Coatings containing the gelatin-grafted polyurethane dispersions may additionally include; crosslinking agents such as aziridines, carbodiimides, epoxides, triazines, polyisocyanates, and methoxyalkyl melamines; gelatin hardeners such as those described, for example, in Research Disclosure No. 38957, September 1996, pages 599 to 600; conductive agents such as electrically-conductive water-soluble or water-dispersible polymers or electrically-conductive metal oxide particles, fibers, or whiskers; inorganic fillers such as clays, silica, mica, $TiO_2$ particles, etc.; magnetic recording particles; lubricants; dyes and pigments; surfactants and coating aids; rheology modifiers; and inorganic or polymeric matting agents.

Coatings containing the gelatin-grafted polyurethane dispersions of the invention may be applied onto various substrates including; plastics, metal, paper, resin-coated paper, glass, and the like, using well-known coating techniques such as hopper coating, air-knife coating, gravure coating, roller coating, dip coating, spray coating, wire rod coating, and curtain coating.

The gelatin-grafted polyurethane dispersions of the invention are particularly useful when employed in one or more layers on an imaging element. Details with respect to the composition and function of a wide variety of different imaging elements are provided in U.S. Pat. No. 5,300,676 and references described therein. The gelatin-grafted polyurethanes of the present invention can be effectively employed in conjunction with any of the imaging elements described in the '676 patent. The gelatin-grafted polyurethanes may be used in an image forming layer or auxiliary layer of the imaging element. Typical auxiliary layers on imaging elements include, overcoat layers, spacer layers, filter layers, interlayers, antihalation layers, pH lowering layers, timing layers, opaque reflecting layers, opaque light-absorbing layers, subbing layers, antistatic layers, subbing layers, undercoat or primer layers, and the like.

The present invention will now be described in detail with reference to examples; however, the invention should not be limited to these examples.

EXAMPLES

Preparation of Gelatin-Grafted Polyurethane Dispersions

Example 1

A commercially available, water-dispersible glassy polyurethane (Sancure 898, a product of BF Goodrich) was grafted to gelatin at a weight ratio of 60 parts polyurethane to 40 parts gelatin by the following procedure: 80 g of polyurethane dispersion (32% solids) and 145 g distilled water were introduced to a 1 liter roundbottom 3-necked flask equipped with a condenser and overhead stirrer. The flask was immersed in a constant temperature bath at 60° C. 0.68 g of 1-(4-morpholinocarbonyl)-4-(2-sulfoethyl) pyridinium hydroxide, inner salt was dissolved in 75 g of water and added to the diluted polyurethane dispersion, an amount of grafting reagent equivalent to 20% of the polyurethane acid groups. Reaction was continued for 40 minutes, during which time 17.0 g of gelatin was dissolved in 153 g of water with heating at 60° C. and neutralized to pH 9 with triethylamine. The gelatin solution was then added via dropping funnel and the grafting reaction allowed to proceed for another 30 minutes. After cooling to 40° C. the product was filtered, with very little insoluble matter observed, then refrigerated. The gelatin-grafted polyurethane dispersion so obtained was stable to storage for months.

Example 2

A water-dispersible rubbery polyurethane (Witcobond 236, a product of Witco Corp.) was grafted to gelatin by the same process employed in Example 1. 213 g of polyurethane dispersion at 20% solids was further diluted with 200 g water and allowed to react with 1.1 g of 1-(4-morpholinocarbonyl)-4-(2-sulfoethyl)pyridinium hydroxide, inner salt for 45 minutes at 60° C. 278 g of a 10% solids pH 9 gelatin solution was then added and reaction continued for 40 minutes. This product was refrigerated without filtration and was observed to contain no insolubles when remelted 2 months after preparation.

Both of the above polyurethane-graft gelatin dispersions formed transparent, void-free films when applied by coating rod onto subbed polyester support.

The invention has been described in detail with particular reference to certain preferred embodiments thereof, but it will be understood that variations and modifications can be effected within the spirit and scope of the invention.

What is claimed is:

1. A water-dispersible polyurethane comprising a polyurethane containing carboxylate groups covalently bonded to gelatin said water-dispersable polyurethane formed by:
   providing a polyurethane dispersion containing carboxylate groups wherein the polyurethane dispersion has an acid number of at least 5;
   contacting the polyurethane dispersion with a grafting agent selected from the group consisting of carbamoylonium salts, dication ethers and carbodiimides;
   contacting the polyurethane dispersion, contacted with the grafting agent, with gelatin to form a polyurethane covalently bonded to gelatin wherein a weight ratio of gelatin to polyurethane is from 1:10 to 2:1.

2. A process for making a water-dispersible polyurethane comprising:
   providing a polyurethane dispersion containing carboxylate groups wherein the polyurethane dispersion has an acid number of at least 5;
   contacting the polyurethane dispersion with a grafting agent selected from the group consisting of carbamoylonium salts, dication ethers and carbodiimides;
   contacting the polyurethane dispersion, contacted with the grafting agent, with gelatin to form a polyurethane covalently bonded to gelatin wherein a weight ratio of gelatin to polyurethane is from 1:10 to 2:1.

3. The process of claim 2 wherein the contacting of the polyurethane with gelatin is in an aqueous medium.

4. The process of claim 3 wherein the polyurethane has a concentration of less than 25 weight percent in the aqueous medium.

5. The process of claim 2 further comprising:
   washing the polyurethane covalently bonded to gelatin.

6. A water-dispersible polyurethane comprising a polyurethane containing carboxylate groups covalently bonded to gelatin through a grafting agent selected from the group consisting of carbamoylonium salts, dication ethers and carbodiimides, wherein the polyurethane containing carboxylate groups has an acid number of at least 5 and wherein the weight ratio of gelatin to polyurethane is from 1:10 to 2:1.

* * * * *